May 17, 1960 F. L. SCHWEITZER, JR 2,937,242

DUAL STYLUS PHONOGRAPH PICKUP

Filed July 21, 1954 2 Sheets-Sheet 1

INVENTOR
FRITZ L. SCHWEITZER, JR.

BY Francis J. Klempay
ATTORNEY

May 17, 1960 F. L. SCHWEITZER, JR 2,937,242

DUAL STYLUS PHONOGRAPH PICKUP

Filed July 21, 1954 2 Sheets-Sheet 2

INVENTOR
FRITZ L. SCHWEITZER, JR.

BY Francis J. Klempay
ATTORNEY

United States Patent Office 2,937,242

Patented May 17, 1960

2,937,242

DUAL STYLUS PHONOGRAPH PICKUP

Fritz L. Schweitzer, Jr., Youngstown, Ohio, assignor to The Astatic Corporation, Conneaut, Ohio, a corporation of Ohio Application July 21, 1954, Serial No. 444,767

8 Claims. (Cl. 179—100.41)

This invention relates to a unitary assembly of a mechanical-electrical transducer for sensing the undulations in the grooves of flat record discs and translating the same into electrical form for amplification, etc. More particularly, the invention relates to a transducer or pickup of this nature which is embodied in cartridge form for ready installation in a tone arm of a phonograph and in which there is provided a pair of styli for alternate use on different styles of records requiring different styli tip radii for faithful reproduction of the respective records.

It is well understood in the art of electrical phonographs that the transducer or pickup assembly should be small in size and light in weight for ease of installation in light-weight tone arms of pleasing design and for the purpose of keeping the stylus pressure within predetermined limits particularly in the case of records of microgroove type. Likewise, the requirements of low inertia and ready compliance of the stylus in transmitting the mechanical vibrations to the piezo-electric or other transducer are well recognized as is also the advantage of being readily able to remove and replace the stylus in the cartridge assembly. A practical arrangement for accomplishing all of these objects while resulting in excellent frequency response and fidelity of reproduction is shown and described in the Cordes U.S. Patent No. 2,575,999 which issued on November 20, 1951 and which is assigned to the assignee of the present invention and application.

It is the primary object of the present invention to provide in the cartridge assembly of the aforementioned Cordes patent for a pair of styli rather than a single stylus whereby the same cartridge and tone arm may be selectively utilized for different types of records. In this manner I provide a dual sytlus pickup cartridge which is exceedingly simple in construction, light in weight, and which has output characteristics identical with the excellent performance of the aforementioned patented style of cartridge regardless of which type of record is being played.

A further object of the invention is the provision, in a dual stylus pickup cartridge, of a simplified and improved arrangement for selectively employing the different styli whereby a minimum of weight is added to the assemblies and, whereby the shifting is accomplished by a manually engageable member which may be located in improved position on the tone arm and which is more readily accessible to the user than comparable assemblies heretofore proposed. Further, the styli shifting mechanism of the present invention, in addition to being simple in design and economical to produce, is of such nature that the cartridge containing it may be installed in a tone arm of any desired design without altering noticeably the design, contours or shape thereof.

The above and other objects and advantages of the invention will become apparent upon consideration of the following detailed specification and the accompanying drawings wherein there is disclosed a preferred embodiment of the invention.

Figures 3, 4, 5, 6:
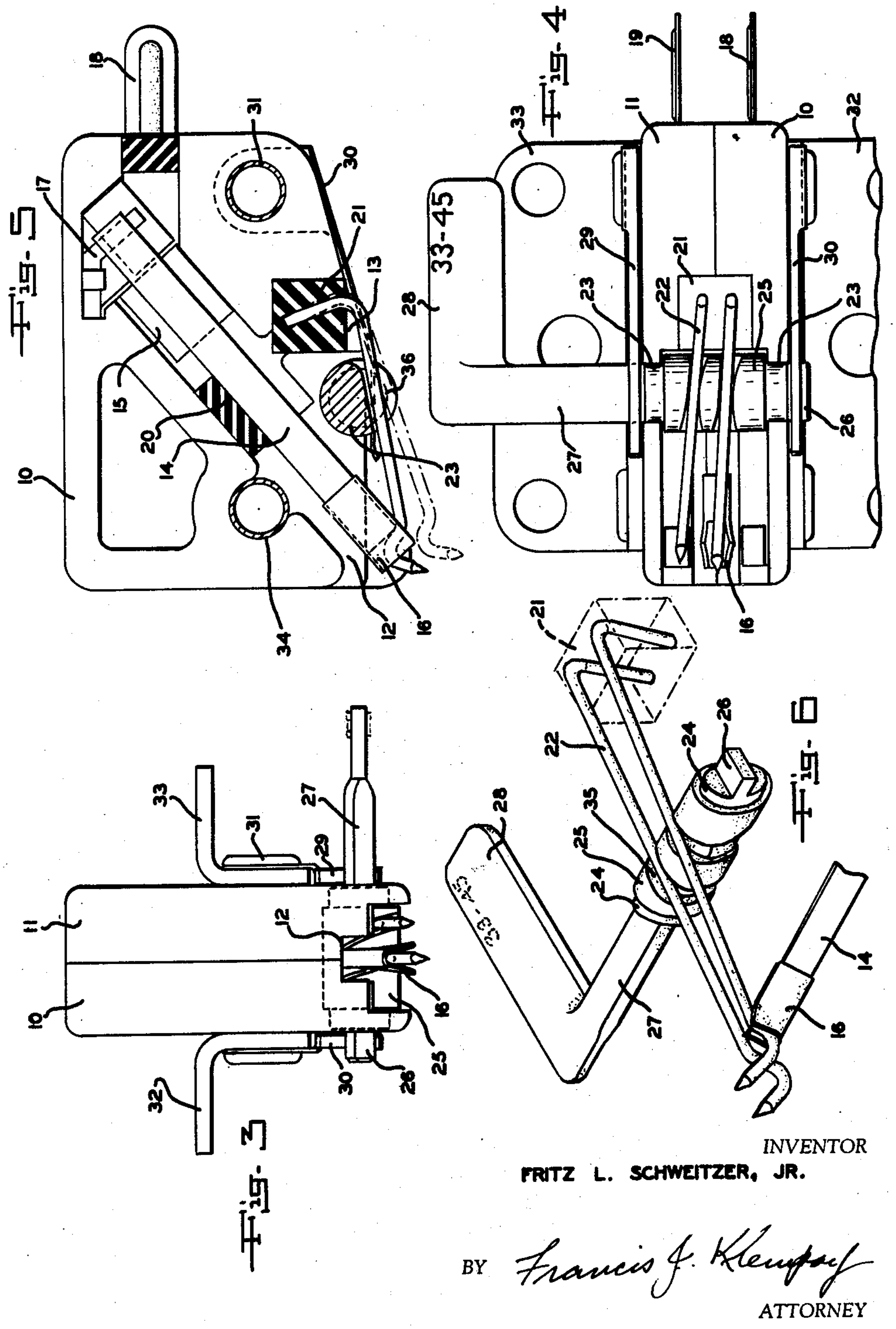
Figures 3 and 4 are front elevation and bottom plane views, respectively, of the cartridge utilized in the assembly of Figures 1 and 2.
Figure 5 is a vertical longitudinal section of the cartridge of my invention.
Figure 6 is a fragmentary perspective view of the apparatus of the invention.

Referring first to Figures 3, 4 and 5, the cartridge assembly illustrated which is generally similar to that shown and described in the aforementioned U.S. Patent No. 2,575,999, comprises a die-cast or molded casing formed of two halves 10 and 11 divided medially along a vertical plane. Each half section of the casing is formed with a downwardly inclined groove or recess 12 and also with a lower and rearwardly disposed recess 13. The recesses 12, when the casing sections are assembled, form a space for the reception of an elongated piezo-electric unit 14 which is preferably of the ceramic bender type, and for securing the fixed end of the crystal in the cartridge casing there is provided clamp locks 15, one on either side of the crystal. The lower end of the crystal is free to vibrate laterally and, in accordance with this invention, there is affixed to the lower end of the crystal an inverted U-shaped connector 16 formed of sheet metal and extending downwardly and outwardly beyond the lower end of the crystal to provide a chuck with diverging side walls as indicated in Figure 3. Spring contacts 17 engaging opposite side surfaces of the crystal and electrically connected to the respective terminal prongs 18 and 19 provide means for transmitting the electrical potential output of the crystal 14. To support the crystal 14 in an upward direction a pad 20 is inserted in the upper portion of the space provided for the crystal 14 and, in practice, pad 20 is of sufficient softness or compliability so as not to impede appreciably the lateral vibration of the crystal.

Received in the space formed by the recesses 13 in the casing sections 10 and 11 is a rubber block 21 formed with a pair of spaced parallel upwardly and forwardly inclined bores to tightly receive correspondingly bent end portions of a pair of wire-like styli 22. The angularity of these bores in relation to the angularity of the rear end portions of the styli 22 is such that the forward or tip portions of the styli are spring biased to upper position by the inherent spring action in the styli, and this upward bias is sufficient to firmly secure the forward end portions of the styli in tight-fitting engagement within the splayed chuck or connector 16. It will be apparent from Figure 4 that the medial plane of the chuck 16 is centrally disposed relative to the upward bent rear end portions of the styli 22 so that the angle between said medial plane and the respective styli will always be at a minimum. The mechanism whereby one of the styli is retracted from both the chuck 16 and from engagement with the record while the other styli is being moved from inoperative position into operative position in the chuck 16 will now be described.

The outer side wall of each of the casing sections 10 and 11 is formed along its bottom edge with a semi-circular recess 23 (Figures 4 and 5) to rotatably receive end portions 24 of reduced diameter of a drum 25. As shown more particularly in Figures 4 and 6 drum 25 is further formed at one end with a short flat projection 26 and at its other end with a lower flat projection 27 which terminates at its outer end in an angularly disposed integral lever 28. Both to retain the drum in its socket and to releasably bias the rotational position of the drum to one or the other of two positions 180° apart I provide a pair of leaf springs 29 and 30 which are positioned along the outside surfaces of the side walls of the casing sections 10 and 11 and which are inherently spring biased into pressure engagement with the flats 26 and 27. For convenience, the fixed ends of the leaf springs 29 and 30 are preferably rigidly anchored by the heads of the rivet 31 which serves to hold the casing sections 10 and 11 together and to anchor one end of the flanges 32 and 33 by which the cartridge assembly is mounted in the tone arm in the manner illustrated in Figures 1 and 2. A second through rivet 34 also serves to hold the casing sections and the flanges in assembled relation.

As shown in Figures 3 through 6, the drum 25 is formed with a pair of spiraling grooves 35 to receive the two styli 22 and each of the grooves 35 has a minimum depth substantially equal to the diameter of the styli wire. Further, by reason of the inherent spring action in the styli wire and the above mentioned angular relation of the upwardly bent rear end portions of the styli, the center portions of the respective styli will always tend to remain bottomed in the spiral grooves of the drum 25.

The pitch of the grooves 35 is such that upon rotation of the drum 25 through 180° in either direction between its limiting positions the forward end portion of one of the styli will be moved from the medial plane of the chuck 16 to a lateral position entirely free and clear of the chuck while the other styli will be moved from its inoperative position into said medial plane. However, a further component of movement must be effected in the front end portions of the styli to enable the same to enter into and out of the chuck 16 in a generally vertical direction. This is accomplished in the apparatus illustrated by providing each of the grooves 35 in the drum 25 with a substantially deepened portion 36 having a flat or chordal bottom which is generally parallel with the adjacent reach of the stylus wire but which is of sufficient depth that it is spaced from the adjacent reach of the particular stylus which is lodged in the chuck 16. Therefore, with the parts in operative position as shown in Figures 5 and 6, initial rotation of the drum 25 from its limiting position will first cause both styli to be depressed sufficiently to clear the lower edge of chuck 16. It will be apparent from Figure 5 that the geometry of the apparatus enables this to be accomplished with but a few degrees of rotation of the drum 25. Continued rotation of the drum then shifts both styli laterally and as the end of the 180° rotation is reached the stylus aligned with the chuck 16 moves up into wedging engagement with the splayed inner surfaces of the chuck while the other stylus springs further upward until restrained by engagement with the flat or chordal bottom of the enlarged portion of the groove 35 receiving it. It should be understood that the particular stylus which is lodged in the chuck 16 has no contact with the drum 25 when the drum is snapped to indexed position by the springs 29, 30, the width of the grooves 35 being sufficient to so space the stylus while the splayed entry in the chuck 16 serves to accurately locate the stylus independently of the grooves 35.

As will be apparent from Figures 3 and 6, the particular stylus 22 which is offset in relation to the chuck 16 when the lever 28 is moved to one of its limiting positions will be positioned, at its forward or tip end, somewhat above the forward or tip end of the stylus which is being held by the chuck. Therefore, in normal use of the cartridge wherein the same is held generally horizontal in the tone arm of the phonograph, only the stylus 22 which is held in the chuck 26 will engage the record groove and transmit the mechanical vibrations thereof. This substantial difference in elevation is provided by the depth of the relatively deep flat or chordal portions of the grooves 35, and is accentuated by the lever advantage which results from positioning the drum 25 rather close to the anchor block 21 as shown in Figure 5.

It should now be apparent that I have provided an improved dual stylus phonograph pickup which accomplishes the objects initially set out. Due to the length and thinness of the shank portions of the styli 22 the forward or tip ends of the same (when considered apart from chuck 16) may vibrate in ready close compliance with the transverse undulations in the record groove, and this fidelity is further insured by the existent minimum mass and inertia in the forward end portions of the styli. Consequently the mechanical undulations of the record groove are faithfully transmitted to the transducer 14 which if properly constructed will thereupon generate electric wave potentials accurately reflective in frequency and amplitude the mechanical undulations of the record. In the present invention all these advantages are retained while yet providing for a simplified arrangement for instantly interchanging the particular stylus employed to suit the style of record being reproduced.

Figures 1, 2:
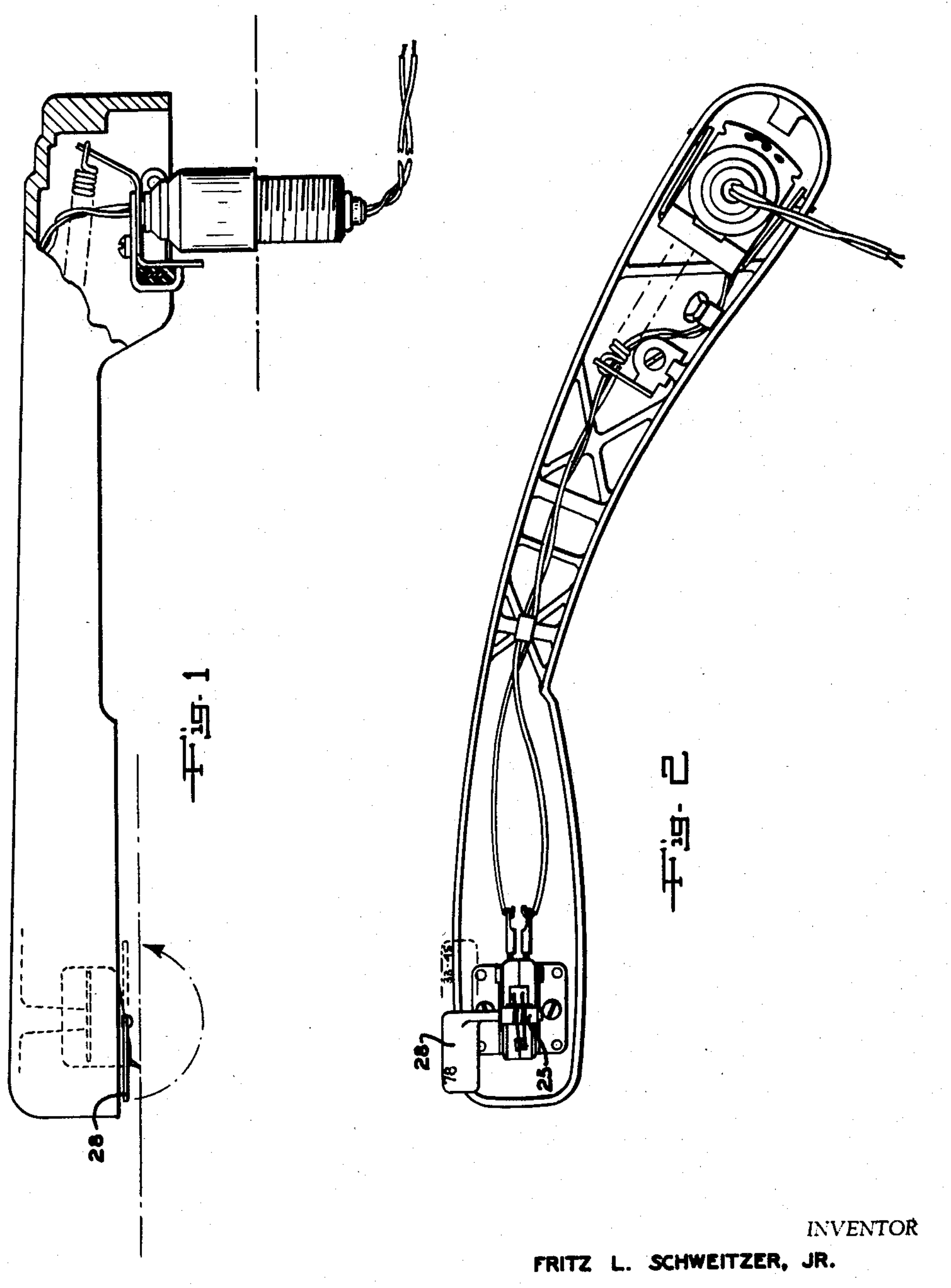
Figure 1 is a side elevation, partly in section, of a phonograph tone arm having installed therein the dual stylus pickup cartridge of my invention.
Figure 2 is a bottom plane view of the assembly of Figure 1.

It should be noted, upon reference to Figures 1 and 2, that the dual stylus cartridge of this invention is, aside from the shifting lever (28), of substantially the same size and outline as the single stylus cartridge shown in the aforementioned Cordes patent. Consequently, the cartridge of the present invention may be readily interchanged with the prior patented cartridge and, in general may be universally adapted in phonograph tone arms of various manufacture and styles. Of course, the dimensions and shape of the operator 27, 28 may be readily varied to suit different installations but it is preferred that the parts be proportioned so that the outer edge portion of the flat lever 28 extends outwardly of the depending side wall of the tone arm only sufficient to make readily observable suitable indicia affixed on opposite sides of the lever 28 as shown in Figures 2 and 6 of the drawing.

Since various changes in details and construction as, for example, the arrangement for alternately shifting the respective styli into and out of the chuck 16, may be made without departing from the spirit or scope of my invention, the above specifically illustrated and described embodiment of the invention should be considered as illustrative only. Reference should therefore be had to the appended claims in determining the scope of the invention.

I claim:

1. In a phonograph pickup cartridge for interchangeable use in standard and micro-groove recording systems the combination of a casing, a piezo-electric crystal secured in said casing and having a freely disposed portion, a coupling member secured to said freely disposed portion, a pair of stylus members resiliently anchored in said casing at a point removed from said freely disposed portion, said coupling member having means to releasably receive one or the other of said stylus members, and a rotatable member disposed transversely to said stylus members and formed with a pair of grooves to receive free portions of said stylus members, said rotatable member being operative upon rotation thereof to interchangeably move said stylus members from operative positions in coupled relation to said crystal to inoperative positions in isolated relation to said crystal.

2. In a phonograph pickup cartridge for interchangeable use in standard and micro-groove recording systems the combination of a casing, a piezoelectric element secured in said casing, a pair of stylus members anchored in said casing independently of each other, a coupling member secured to said element and having means to releasably receive a portion of one or the other of said stylus members, means to interchangeably move said stylus members from operative positions in coupled relation to said element to inoperative positions in isolated relation to said element and each other, said means to move said stylus members comprising means operative to first disengage the then operative one of said stylus members from said coupling member and then to move said stylus members simultaneously to interchanged positions, said means to move further comprising a rotatable member journaled in said casing and having spiral grooves therein whereby upon rotation of said rotatable member said stylus members are engaged by said grooves and shifted laterally with respect to said element.

3. Apparatus according to claim 2 further characterized by said coupling member having a downwardly opening stylus-receiving recess therein, and said grooves having flat portions therein overlying said stylus members when said rotatable member is in either of two operative limit positions, the arrangement being such that upon initial rotation of said rotatable member said stylus members are moved in vertical directions clear of said downwardly opening recess and upon continued rotation of said rotatable member said stylus members are first shifted laterally of said recess and then upwardly so that the originally inoperative one of said stylus members is received in said recess in coupled relation with said element.

4. Apparatus according to claim 2 further characterized by said casing having downwardly opening journal portions to receive said rotatable member, said rotatable member having flat portions, and upwardly acting spring means carried by said casing and acting upon said flat portions to retain said rotatable member in said journal portions and to urge said rotatable member into operative limit positions.

5. In a phonograph pickup cartridge for interchangeable use in standard and micro-groove recording systems the combination of a casing, a piezoelectric element secured in said casing, a pair of stylus members anchored in said casing independently of each other, a coupling member secured to said element and having means to releasably receive a portion of one or the other of said stylus members, means to interchangeably move said stylus members from operative positions in coupled relation to said element to inoperative positions in isolated relation to said element and each other, said means to move said stylus members comprising means operative to first disengage the then operative one of stylus members from said coupling member and then to move said stylus members simultaneously to interchanged positions, said means to move further comprising a generally cylindrical rotatable member journaled in said casing for rotation about its longitudinal axis and carrying cam means whereby upon rotation of said rotatable member said stylus members are engaged by said cam means and shifted laterally with respect to said element.

6. Apparatus according to claim 5 further characterized in that said pair of stylus members comprises a pair of elongated reaches, said stylus members being anchored in said casing adjacent one set of ends thereof, said portions of said stylus members being adapted to be releasably received by said coupling member being adjacent the other set of ends of said stylus members, said rotatable member being disposed intermediate said portions and said one set of ends thereof, and said rotatable member being journaled in said casing for rotation about an axis extending transversely to said stylus members and said element.

7. Apparatus according to claim 5 further characterized in that said cam means comprises a pair of spiral grooves, and said grooves having flat portions therein overlying said stylus members when said rotatable member is in either of two operative limit positions.

8. In a phonograph pickup cartridge for interchangeable use in standard and micro-groove recording systems the combination of a casing, a piezoelectric element secured in said casing, a pair of stylus members having one set of ends thereof anchored independently of each other, a coupling member secured to said element and having means to releasably receive a portion of one or the other of said stylus members, means to interchangeably move said stylus members from operative positions in coupled relation to said element to inoperative positions in isolated relation to said element and each other, said means to move said stylus members comprising means operative to first disengage the then operative one of stylus members from said coupling member and then to move said stylus members simultaneously to interchanged positions, said means to move further comprising a generally cylindrical rotatable member journaled in said casing for rotation about its longitudinal axis and carrying cam means whereby upon rotation of said rotatable member and said cam means said stylus members are engaged and shifted laterally with respect to said element.

References Cited in the file of this patent

UNITED STATES PATENTS

| | | |
|---|---|---|
| 904,884 | Lewis | Nov. 24, 1908 |
| 1,120,841 | Norris | Dec. 15, 1914 |
| 1,503,854 | Seelau | Aug. 5, 1924 |
| 2,554,209 | Miner et al. | May 22, 1951 |
| 2,575,999 | Cordes | Nov. 20, 1951 |
| 2,689,734 | Wennerbo | Sept. 21, 1954 |
| 2,816,056 | Harris | Dec. 10, 1957 |